United States Patent
Mueller et al.

(10) Patent No.: US 10,528,148 B2
(45) Date of Patent: Jan. 7, 2020

(54) MOTOR VEHICLE WITH AT LEAST ONE RADAR UNIT

(71) Applicant: AUDI AG, Ingolstadt (DE)

(72) Inventors: Ulrich Mueller, Ingolstadt (DE); Michael Schlittenbauer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/761,757

(22) PCT Filed: Sep. 23, 2016

(86) PCT No.: PCT/EP2016/072699
§ 371 (c)(1),
(2) Date: Mar. 20, 2018

(87) PCT Pub. No.: WO2017/084793
PCT Pub. Date: May 26, 2017

(65) Prior Publication Data
US 2018/0267620 A1 Sep. 20, 2018

(30) Foreign Application Priority Data
Nov. 20, 2015 (DE) .................. 10 2015 015 067

(51) Int. Cl.
*G06F 3/041* (2006.01)
*G06F 3/01* (2006.01)
(Continued)

(52) U.S. Cl.
CPC .............. *G06F 3/017* (2013.01); *B60K 35/00* (2013.01); *B60K 37/06* (2013.01); *G01S 7/415* (2013.01);
(Continued)

(58) Field of Classification Search
CPC ................ G09G 2380/10; G06F 3/017; G06F 2203/04101; G06F 3/04847; G01S 7/415;
(Continued)

(56) References Cited

U.S. PATENT DOCUMENTS

| | | | | |
|---|---|---|---|---|
| 2008/0053233 A1* | 3/2008 | Sugiura | ................. | B60K 35/00 73/628 |
| 2011/0181509 A1* | 7/2011 | Rautiainen | .............. | G06F 3/017 345/158 |

(Continued)

FOREIGN PATENT DOCUMENTS

| | | |
|---|---|---|
| CN | 1602381 | 3/2005 |
| CN | 102163079 | 8/2011 |

(Continued)

OTHER PUBLICATIONS

English Translation by WIPO dated May 24, 2018 of the International Preliminary Report on Patentability in corresponding International Patent Application No. PCT/EP2016/072699.

(Continued)

*Primary Examiner* — Adam J Snyder
(74) *Attorney, Agent, or Firm* — Staas & Halsey LLP

(57) ABSTRACT

A respective sensing region of at least one radar unit is oriented into a passenger compartment of the motor vehicle and a control device is configured to sense a position of a body part of a person and/or a movement of the body part in the passenger compartment on the basis of the reflection respectively received by the at least one radar unit, thus providing non-contact detection of the body part of the person in the motor vehicle. As viewed from the passenger compartment, the at least one radar unit can be arranged behind a display surface of a display device or alongside the display surface of the display device.

20 Claims, 5 Drawing Sheets

(51) Int. Cl.
*G01S 7/41* (2006.01)
*G01S 13/50* (2006.01)
*G01S 13/88* (2006.01)
*B60K 37/06* (2006.01)
*G06F 3/0484* (2013.01)
*B60K 35/00* (2006.01)

(52) U.S. Cl.
CPC .............. *G01S 13/50* (2013.01); *G01S 13/88* (2013.01); *G06F 3/04847* (2013.01); *B60K 2370/11* (2019.05); *B60K 2370/146* (2019.05); *B60K 2370/1438* (2019.05); *B60K 2370/1464* (2019.05); *B60K 2370/164* (2019.05); *B60K 2370/199* (2019.05); *B60K 2370/48* (2019.05); *B60K 2370/52* (2019.05)

(58) Field of Classification Search
CPC ......... G01S 13/50; G01S 13/88; B60K 35/00; B60K 37/06
See application file for complete search history.

(56) References Cited

U.S. PATENT DOCUMENTS

| | | | | |
|---|---|---|---|---|
| 2011/0205164 A1* | 8/2011 | Hansen | .................. | B60K 37/06 345/173 |
| 2012/0092284 A1* | 4/2012 | Rofougaran | ............ | G06F 3/017 345/173 |
| 2012/0280900 A1 | 11/2012 | Wang et al. | | |
| 2013/0094126 A1* | 4/2013 | Rappoport | .............. | G06F 3/042 361/679.01 |
| 2015/0177866 A1* | 6/2015 | Hwang | .................. | G06F 3/042 345/175 |
| 2015/0185314 A1* | 7/2015 | Corcos | .................... | G01S 13/34 342/200 |
| 2016/0274220 A1* | 9/2016 | Autran | .................... | G01S 17/89 |
| 2017/0052618 A1* | 2/2017 | Lee | ......... | G06F 3/041 |

FOREIGN PATENT DOCUMENTS

| | | |
|---|---|---|
| CN | 103076911 | 5/2013 |
| CN | 103502911 | 1/2014 |
| DE | 102004037796 A1 | 7/2005 |
| DE | 102011075725 A1 | 11/2012 |
| DE | 102013211335 A1 | 12/2014 |
| DE | 102013012466 A1 | 1/2015 |
| DE | 102013220240 A1 | 4/2015 |
| DE | 202015100273 U1 | 5/2015 |
| WO | 2015/149049 A1 | 10/2015 |
| WO | 2016/176574 A1 | 11/2016 |

OTHER PUBLICATIONS

International Search Report for PCT/EP2016/072699 dated Mar. 28, 2017.
Office Action for German Application No. 102015015067.7 dated Aug. 25, 2016.
DE102015015067.7, Nov. 20, 2015, Ulrich Mueller et al., AUDI AG.
PCT/EP2016/072699, Sep. 23, 2016, Ulrich Mueller et al., AUDI AG.
Office Action dated Mar. 1, 2019 in corresponding Chinese Patent Application No. 201680050851.4.

* cited by examiner

MOTOR VEHICLE WITH AT LEAST ONE RADAR UNIT

CROSS REFERENCE TO RELATED APPLICATIONS

This application is the U.S. national stage of International Application No. PCT/EP2016/072699, filed Sep. 23, 2016 and claims the benefit thereof. The International Application claims the benefit of German Application No. 10 2015 015 067.7 filed on Nov. 20, 2015, both applications are incorporated by reference herein in their entirety.

BACKGROUND

Described below is a motor vehicle having at least one radar unit for emitting a radar signal and for receiving a reflection of the radar signal.

It is known from the related art to detect objects in an environment of a motor vehicle from the motor vehicle using a radar unit. For this purpose, the objects must be made of metal in order still to obtain a detectable reflection of the emitted signal over the comparatively large distances.

For near-field detection in direct proximity to the motor vehicle, it is known use ultrasonic sensors. This enables even non-metallic objects to be detected, e.g. bodies of persons.

In order to sense persons in the interior of a motor vehicle in a non-contact fashion, a camera can be used. If the actuation of operating devices is involved, a non-contact operational control can be realized by capacitive sensors or infrared sensors. Camera-based gesture recognition can also be used in the motor vehicle for identifying an actuation of an operating element.

SUMMARY

The detecting a person or at least one body part of a person in a passenger compartment of a motor vehicle, enables, for example, a non-contact actuation of an operating apparatus.

In the motor vehicle described below, at least one radar unit for emitting a radar signal and for receiving a reflection of the emitted radar signal is provided. The reflection thus constitutes the radar signal after the latter has been reflected back to the radar unit at a radar-reflecting element. Accordingly, provision is made for using the at least one radar unit in the passenger compartment of the motor vehicle. For this purpose, provision is made for a respective sensing region of the at least one radar unit to be oriented into the passenger compartment, and for a control device to be configured to sense a position of a body part of a person and/or a movement of the body part in the passenger compartment on the basis of the reflection respectively received by the at least one radar unit. A relative location or position of the body part with respect to the respective radar unit and/or a speed of movement can be sensed by a radar unit.

The motor vehicle described below affords the advantage that radar-based gesture recognition can be realized in the passenger compartment. In this case, an insight is that in the case of a distance between the radar unit and body part such as arises in a passenger compartment of a motor vehicle, even non-metallic objects generate a reflection strong enough to be able to detect the latter by a radar unit and to use this to deduce the position of the body part and/or the movement of the body part.

In accordance with one development, the at least one radar unit is configured to generate its radar signal with a frequency profile and/or an amplitude profile which result(s) in the reflection being brought about by a body fluid of the body part. In other words, by way of example, the skin of a hand may suffice to generate the reflection. This affords the advantage that the operational control of the motor vehicle does not necessitate any reflection aids in order to generate a sufficiently strong, reflected radar signal. In this case, frequency profile means that the absolute value of the frequency and/or a change in the frequency value are/is set over time. Correspondingly, amplitude profile means that, for a given frequency, the absolute value of the amplitude is set and/or the absolute value of the amplitude is varied over time. Suitable radar signals having a corresponding frequency profile and/or amplitude profile which are reflected sufficiently strongly within a passenger compartment even by the body fluid of a body part can be determined by the person skilled in the art using simple experiments.

In accordance with one development, the respective range of the at least one radar unit is less than 50 cm, in particular less than 30 cm. In other words, the body part is sensed only in a partial region of the passenger compartment. In particular, this development enables a non-contact actuation of an operating apparatus, without arbitrary movements in the rest of the passenger compartment likewise being incorrectly interpreted as a desire for operational control.

In accordance with one development, the motor vehicle includes a display device for displaying a graphical operating element on a display surface. The display device can be for example a screen such as, for instance, a TFT screen (TFT—Thin Film Transistor) or OLED screen (OLED—Organic Light Emitting Diode). The graphical operating element can be for example part of a graphical user interface (GUI). The control device is configured to set an adjustment value displayed by the operating element depending on the sensed position and/or the sensed movement. If the operating element is for example a position pointer (mouse pointer or menu selection element), then the body part can be used to define a position of the position pointer in a non-contact fashion. The operating element can also be a slider, for example, which can then be set or displaced by a non-contact translational movement of the body part.

One development provides for the movement to include a relative movement of at least two members of the body part. The body part can be a hand, for example, wherein the relative movement of at least two fingers is then sensed as relative movement of the members. The control device is designed to set the adjustment value of the operating element depending on the relative movement. This affords the advantage that an absolute initial position of the body part is not necessary for setting the adjustment value. A user can thus arrange the body part, for example the user's hand, at an arbitrary position in the sensing region of the at least one radar unit. The setting of the adjustment value is not influenced in this case. It is only as a result of the relative movement of the at least two members of the body part being generated that the adjustment value is then altered.

One development provides for the operating element to be a rotary controller. The adjustment value of the rotary controller is then for example the rotary position of the rotary controller or the value displayed by the rotary controller. The control device is configured to sense a rubbing movement of two fingers as relative movement. The user can thus for example rub the thumb over the index finger and thereby adjust or set the rotary controller. This corresponds to a movement such as is carried out by the fingers when a manual rotary controller is rotated between the fingers. This development has the particular advantage that a non-contact setting of a rotary controller is made possible without this necessitating that a circular movement be carried out by the body part or the members, which can be coordinated by a human being only with difficulty in free space. On a touchscreen, too, setting a rotary controller generally poses a problem since a circular path on a smooth screen surface can be set in an exact manner only with increased coordination complexity.

One development makes it possible to acknowledge the value set, in order that the body part can subsequently be moved, without the adjustment value that has been set being adjusted. This development provides for the movement to include bringing together and/or moving apart two fingers, and the control device to be configured to acknowledge the adjustment value upon identification of this movement. Thereafter, the possibility for setting the operating element is thus blocked or ended.

Some developments relate to arranging the at least one radar unit in the motor vehicle. One development in this respect provides that, as viewed from the passenger compartment, at least one of the at least one radar unit is arranged behind the display surface of the display device in such a way that its sensing region penetrates through the display surface. In other words, the radar unit emits the radar signal through the display surface into the passenger compartment. This affords the advantage of enabling operational control of an operating element that is displayed in a central region of the display surface, that is to say e.g. in the inner third. This development presupposes that the electrically conductive elements in the display surface, that is to say for example the transistors of a TFT screen and the corresponding electrical leads, do not cause any disturbing reflections. This can be determined by simple experiments.

One development provides that as viewed from the passenger compartment, at least one of the at least one radar unit is arranged alongside the display surface of the display device in such a way that its sensing region is oriented past the display surface. In particular, the emission direction with the highest radiation intensity does not intersect the display surface. The disturbing reflections described can be prevented as a result. Furthermore, this enables operational control of operating elements without the driver's view of the operating element being obstructed here by his/her own body part.

One development relates to the trimming or cladding of the at least one radar unit. In this development, provision is made for a trim part composed of glass to be arranged between the at least one radar unit and the passenger compartment. The glass can be colored or coated with an opaque layer. Glass has the advantage that it is electrically nonconductive and hence does not interfere with the radar signal. A stable surface of a trim part can nevertheless be provided.

The motor vehicle may be an automobile, in particular a car.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
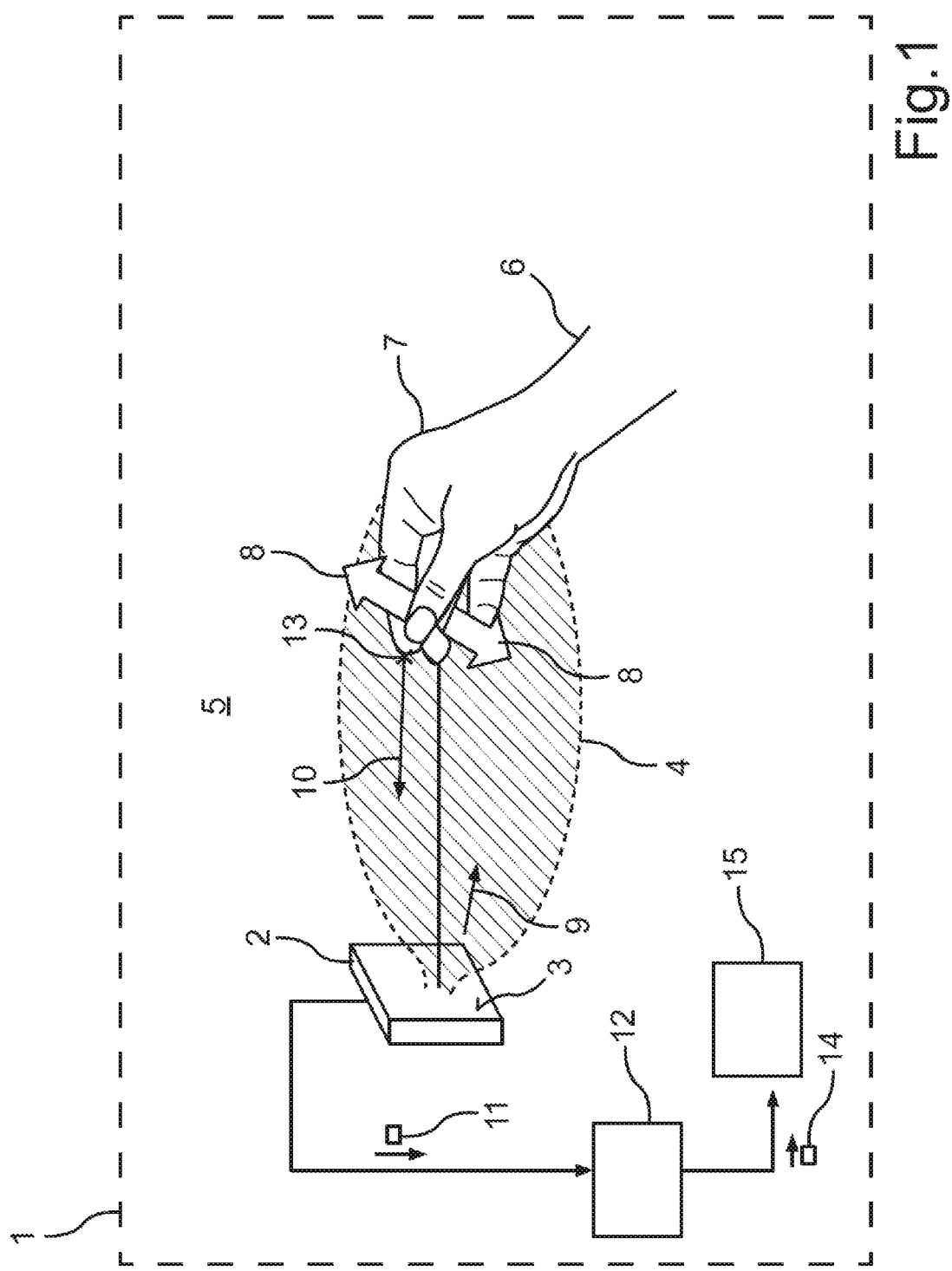
FIG. 1 is a schematic block diagram and perspective view of one embodiment of the motor vehicle.

In the exemplary embodiment described below, components of the embodiment in each case represent individual features which should be considered independently of one another and should also be regarded in a different combination than that shown. Furthermore, the described embodiment can also be supplemented by further features from among those already described.

In the drawings, functionally identical elements are in each case provided with the same reference signs.

FIG. 1 shows a motor vehicle 1, which can be for example an automobile, in particular a car. The motor vehicle 1 has a radar unit 2. The radar unit 2 is configured as a so-called nano-radar. An antenna 3 of the radar 2 can be realized for example as an integrated circuit or as a patch antenna or patch array antenna having a dimension of less than 5 centimeters. A sensing region 4 of the radar unit 2 is oriented in an interior or passenger compartment 5 of the motor vehicle 1. A person 6 situated in the passenger compartment 5 can reach into the sensing region 4 and carry out a movement 8 with a body part 7, for example a hand. The sensing region 4 is determined by a radar signal 9, which is emitted into the passenger compartment 5 by the antenna 3. A body fluid in the body part 7, that is to say the body cells or bloodstream of the body part 7, reflects the radar signal 9, as a result of which a reflection 10 is returned to the antenna 3. The radar unit 2 can thus receive the reflection 10 and generate a reflection signal 11 depending on the reflection 10. A control device 12 can identify a position 13 of the body part 7 in the sensing region 4 and/or the movement 8 on the basis of the reflection signal 11. Depending on the identified position 13 and/or movement 8, a control signal 14 for a vehicle component 15 can be generated by the control device 12. By way of example, the vehicle component 15 can be an infotainment system (information-entertainment system) and/or an air-conditioning device of the motor vehicle 1. The control device 12 can be realized for example on the basis of a processor device, for example a microprocessor or microcontroller. In this respect, the control device 12 can be realized by a control unit, for example.

Figure 2:
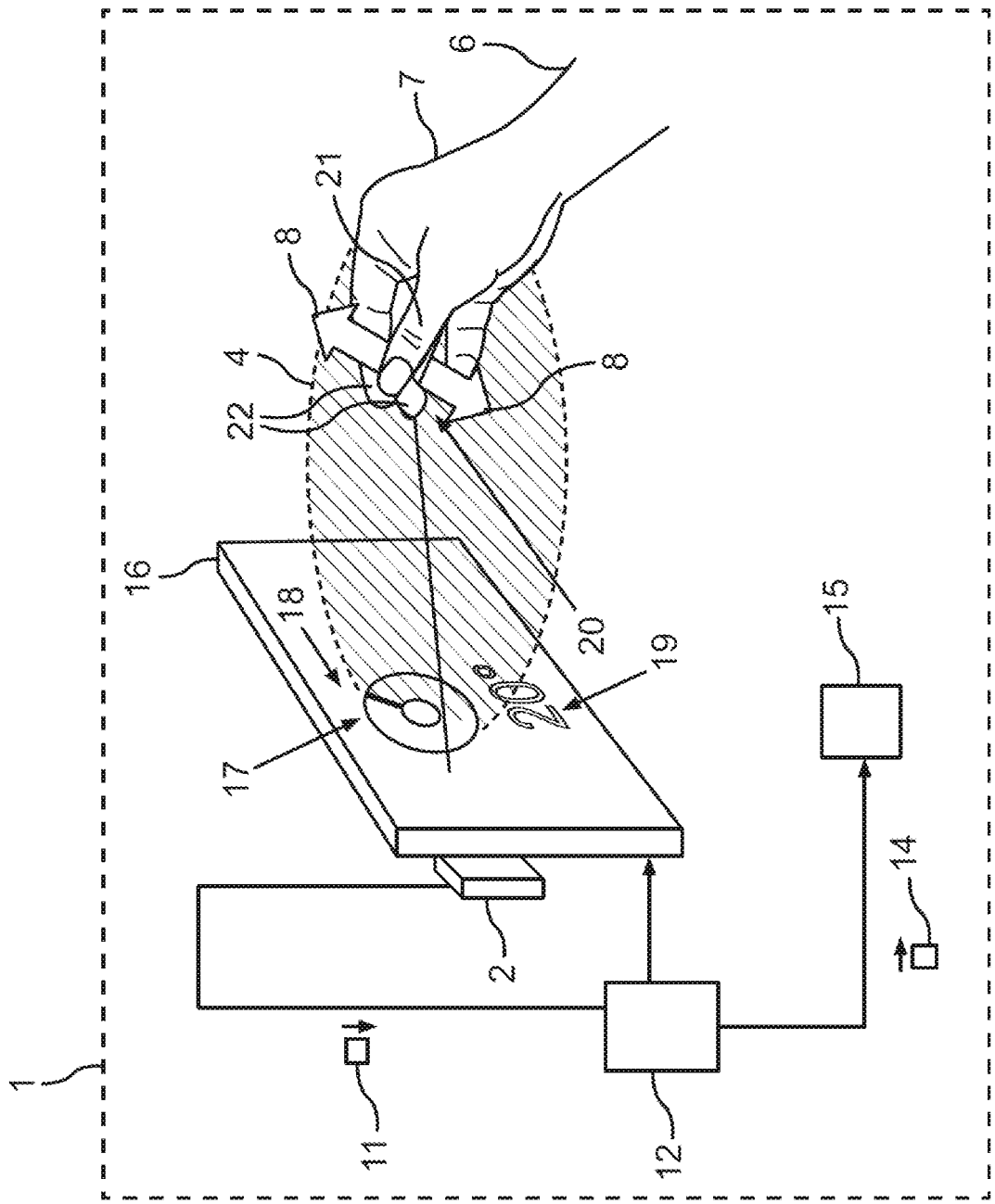
FIG. 2 is a schematic block diagram and perspective view of an embodiment with a radar sensor and a display device such as can be provided in the motor vehicle from FIG. 1.

FIG. 2 illustrates how, in the motor vehicle 1, the radar unit 2 and the control device 12 can be used to realize an operating device having a graphical user interface. For this purpose, a display device 16 is provided, which can be for example a TFT screen or OLED screen. The display device 16 can also be configured as a touchscreen. The display device 16 can be arranged for example in a center console or a dashboard of the motor vehicle 1. The control device 12 may generate, for example, a graphical operating element 17 on the display device 16. In the example illustrated in FIG. 2, the operating element 17 is a rotary controller 18, the adjustment value 19 of which is adjusted or set by a rotary position of the rotary controller 18 being varied or set. The adjustment value 19 can be for example a compartment temperature for the passenger compartment 5. Correspondingly, using the control device 12, depending on the current adjustment value 19 as control signal 14, it is possible to generate a setpoint value signal for a vehicle component 15 that sets the compartment climate in the passenger compartment 5.

In order to operate the rotary controller 18 in a non-contact fashion using the control device 12 on the basis of the reflection signal 11 as movement 8, it is possible to identify a relative movement 20 of a first finger 21, for example of the thumb, with respect to one or more other fingers 22, for example the index finger and the middle finger. During the development or production of the control device 12, experimental measurements ascertained what time profile of the reflection signal 11 corresponds to such a relative movement 20. As a result, the control device 12 can recognize the relative movement 20 e.g. by pattern comparison.

Depending on the relative movement 20, the control device 12 causes the display device 16 to change the representation of the operating element 17, that is to say that the adjustment value 19 is set or varied. In addition, the control signal 14 for the vehicle component 15 can be generated.

After the setting process, the person 6 would like to remove the body part 7 again from the sensing region 4. In order that the adjustment value 19 is not inadvertently readjusted in the process, the person 6 can firstly acknowledge the input in order to prevent a further alteration of the adjustment value 19.

Figure 3:
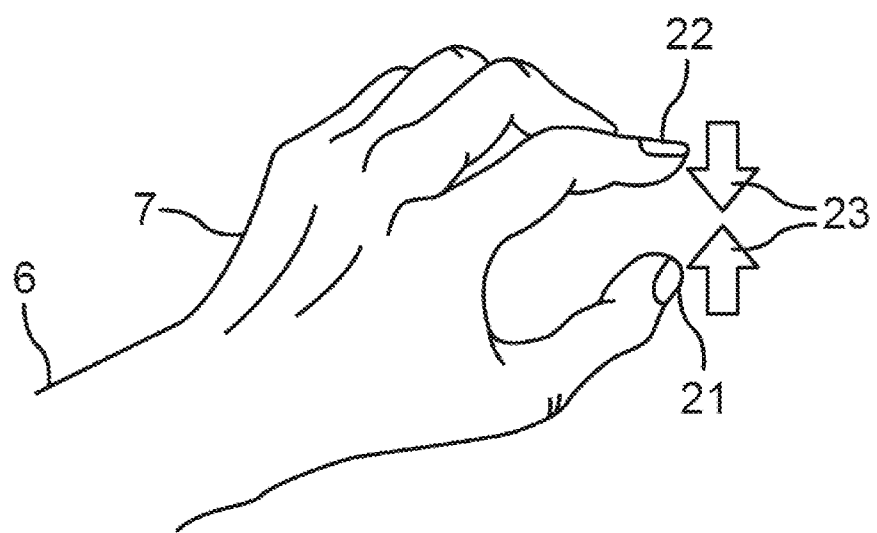
FIG. 3 is a perspective view of an operating gesture for acknowledging an input.

FIG. 3 shows in this respect a gesture which can likewise be recognized on the basis of the reflection signal 11. In this case, the fingers 21, 22 are brought into contact by bringing together 23. This symbolizes clicking using a mouse button. When the bringing together 23 is identified, the adjustment value 19 is blocked, that is to say that it remains unchanged independently of further reflection signals 11. The person 6 can then move the body part 7 out of the sensing region 4. The gesture can also be provided for confirming a menu selection.

Figure 4:
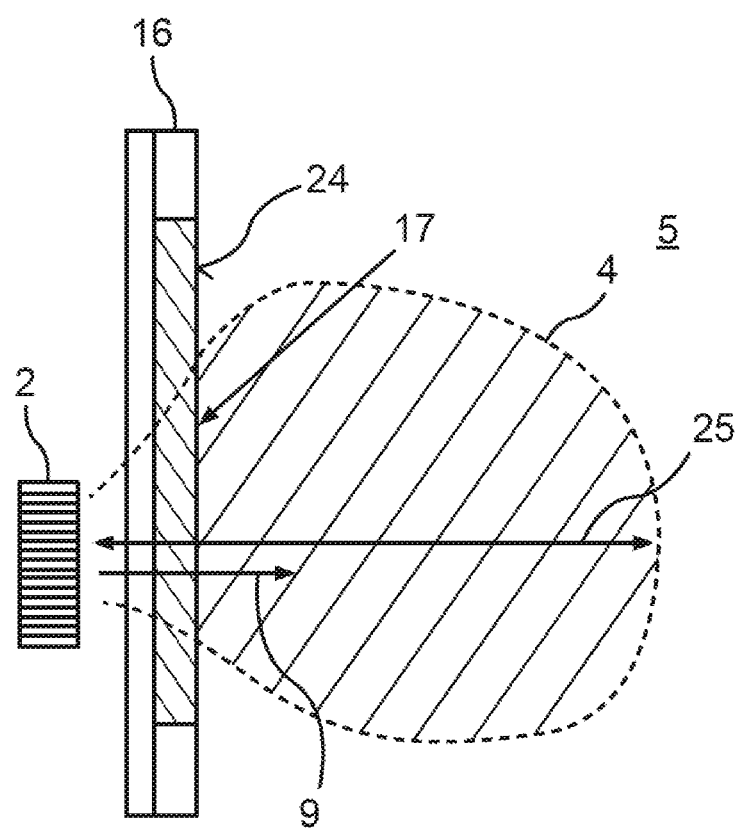
FIG. 4 is a schematic cross section through the display device from FIG. 2.

FIG. 4 illustrates how the radar unit 2 can radiate the radar signal 9 through a display surface 24 of the display device 16. The sensing region 4 correspondingly penetrates through the display surface 24. The display surface 24 is the pixel area, that is to say that region in which the graphical operating element 17 and further graphical operating elements can be displayed as pixel graphics. The display surface 24 can thus display a graphical user interface with the operating element 17 to be adjusted. It is defined for example by the TFT matrix of a TFT screen. In contrast to the illustration shown in FIG. 4, it is also possible to install a plurality of radar units 2 as sensors behind the display device 16.

Figure 5:
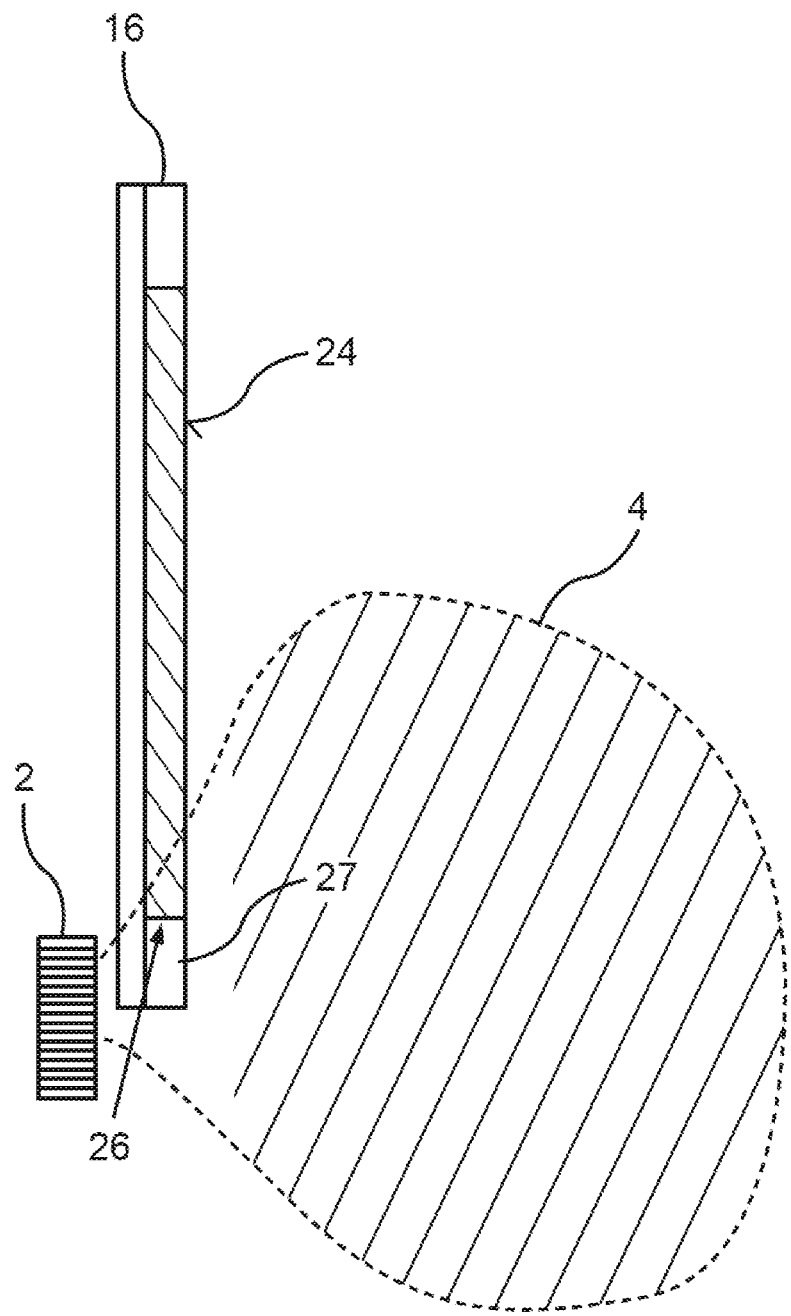
FIG. 5 is a schematic cross section through an alternative configuration of the embodiment illustrated in FIG. 2

FIG. 5 shows an alternative arrangement if the damping of the radar signal 9 and of the reflection 10 behind the display surface 24 is too high, such that a range 25 of the sensing region 4 into the passenger compartment 5 is too small. This may be caused for example by a conductive ITO layer of the display surface 24 (ITO—Indium Tin Oxide). In this case, the radar unit 2 can be fitted to an edge 26 of the active region, that is to say the display surface 24 of the display device 16. In this case, it can be arranged for example behind a glass pane 27 that also covers and/or protects the display surface 24. Finger recognition of the fingers 21, 22 at the edge 26 of the screen is thus possible.

The display device can also be a touchscreen. The inclusion of radar unit 2 and control device 12 provides an advantageous alternative or addition to a touchscreen. Via a touchscreen, diverse vehicle or infotainment functions can be controlled by touch or by pressure. In this case, often use is made of sliders (sliding regulators) or occasionally use is made of rotary regulators on the graphical user interface of the touchscreen. In this case, the respective function can be adjusted by sliding over it using the finger on the touchscreen. In this case, however, the surface of the touchscreen always has to be touched. Rotary controllers on the graphical interface are difficult to operate since the finger has to be guided over the screen on a circular path. Sliders are difficult to operate since an exact movement over the touch surface (touch-sensitive surface) with arm outstretched in the motor vehicle is likewise difficult.

A movement pattern and/or speed pattern of a radar-reflecting element can be sensed by a radar unit 2. In the case of sensing with a range 25 ranging from 15 to 25 centimeters it is possible here to sense even a body part 7 which has no metallic reflectors. Here the body fluid of a body part is sufficient to generate a detectable reflection 10. The radar unit can be installed behind nonconductive or weakly conductive materials and can be oriented by the sensing region 4 into the passenger compartment 5. Consequently, in the passenger compartment 5 it is possible for example to recognize finger movement patterns, such as, for example, the described rubbing of the thumb against the index finger. Such a rubbing movement is similar to the adjustment of a small rotary wheel such as is carried out for example in the case of a mechanical clock. Other movement patterns can also be recognized, such as the "clicking together" of the thumb and index finger as described in association with FIG. 3.

In the case of the motor vehicle 1 this is exploited in order to arrange one or more radar units behind a screen. On the screen it is then possible to display a rotary controller 18 for any desired functions, for example volume, balance, air-conditioning temperature, as operating element in the graphical user interface. The radar unit 2 is then situated behind the screen at this location. The radar unit 2 recognizes the fingers 21, 22 in front of the screen and the movement patterns of the fingers. Using the hand 7 in front of the screen, on which the rotary controller 18, for example, is then displayed, the person 6 can adjust the rotary controller by the described rubbing movement between the thumb and the index finger.

Instead of the rotary controller, a slider or some other graphical operating element can also be adjusted in the same way.

Further functions, such as selecting from an operating menu or from a group of numbers, switching and scrolling of operating menus, can be performed by the same movement gesture or one or more further movement gestures. In this case, by way of example, the described gesture from FIG. 3 (clicking together) can also be used.

Consequently, the described embodiment makes it possible to adjust graphical rotary controllers and other graphical operating elements on a screen in a non-contact fashion. In this case, the screen can additionally also be configured as a touchscreen, such that operational control can also be effected in a redundant manner on the screen on the basis of touch. The movements described have proved to be advantageous since they are grasped particularly intuitively by persons.

Overall the example shows how a virtual rotary controller can be realized in front of a screen.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A motor vehicle, comprising:
   a passenger compartment;
   at least one radar transceiver respectively configured to emit a radar signal and receive a reflection of the radar signal, respectively into and from a respective sensing region in the passenger compartment of the motor vehicle;
   a control device configured to sense at least a relative movement of at least two fingers of a hand in the passenger compartment based on the reflection respectively received by the at least one radar transceiver; and
   a display device having a display surface and configured to
      display a graphical operating element on the display surface, and
      set an adjustment value displayed by the operating element based on a comparison of at least the relative movement with stored patterns of movement respectively correlated to predefined adjustment values,
   wherein, as viewed from the passenger compartment, at least one of the at least one radar transceiver mounted behind the display device, emits the radar signal into the passenger compartment through the display device, and has the respective sensing region penetrate through the display surface.

2. The motor vehicle as claimed in claim 1, wherein the at least one radar transceiver is configured to generate the radar signal with at least one of a frequency profile and an amplitude profile producing the reflection from a body fluid of the at least two fingers.

3. The motor vehicle as claimed in claim 2, wherein a respective range of the at least one radar transceiver is less than 50 cm.

4. The motor vehicle as claimed in claim 2, wherein a respective range of the at least one radar transceiver is less than 30 cm.

5. The motor vehicle as claimed in claim 4,
   wherein the operating element is a rotary controller, and
   wherein the control device is configured to sense a rubbing movement of the at least two fingers as the relative movement.

6. The motor vehicle as claimed in claim 5,
   wherein the movement of the at least two fingers includes at least one of bringing together and moving apart the at least two fingers, and
   wherein the control device is configured to acknowledge the adjustment value upon identification of the movement.

7. The motor vehicle as claimed in claim 1, wherein a respective range of the at least one radar transceiver is less than 50 cm.

8. The motor vehicle as claimed in claim 1, wherein a respective range of the at least one radar transceiver is less than 30 cm.

9. The motor vehicle as claimed in claim 1,
   wherein the operating element is a rotary controller, and
   wherein the control device is configured to sense a rubbing movement of the at least two fingers as the relative movement.

10. The motor vehicle as claimed in claim 9, wherein the control device includes a memory storing the stored patterns of movement, each corresponding to a time profile of the reflection of the radar signal.

11. The motor vehicle as claimed in claim 1, wherein the movement of the at least two fingers includes at least one of bringing together and/or moving apart the at least two fingers, and
    wherein the control device is configured to acknowledge the adjustment value upon identification of the movement.

12. An operation control system for a motor vehicle having a passenger compartment, comprising:
    a display device having a display surface and configured to display a graphical operating element on the display surface;
    at least one radar antenna mounted behind the display device, as viewed from the passenger compartment;
    at least one radar transceiver, respectively coupled to the at least one radar antenna and configured to emit a radar signal from the radar antenna through the display device into a respective sensing region in the passenger compartment and receive a reflection of the radar signal at the radar antenna from the respective sensing region which penetrates through the display surface; and
    a control device configured to
       sense at least a relative movement of at least two fingers of a hand in the passenger compartment based on the reflection respectively received by the at least one radar antenna; and
       set an adjustment value displayed by the operating element based on a comparison of at least the relative movement with stored patterns of movement respectively correlated to predefined adjustment values.

13. The operation control system as claimed in claim 12, wherein at least one of the at least one radar transceiver emits the radar signal into the passenger compartment through the display surface, and has the respective sensing region penetrate through the display surface.

14. The operation control system as claimed in claim 13, wherein a respective range of the at least one radar transceiver is less than 30 cm based on the reflection of the radar signal emitted by the at least one radar antenna.

15. The operation control system as claimed in claim 12,
    wherein the operating element is a rotary controller, and
    wherein the control device is configured to sense a rubbing movement of the at least two fingers as the relative movement.

16. The operation control system as claimed in claim 15, wherein the control device includes a memory storing the stored patterns of movement, each corresponding to a time profile of the reflection of the radar signal.

17. A method of controlling a motor vehicle having a passenger compartment, comprising:
    displaying a graphical operating element on a display surface of a display device;
    emitting at least one radar signal from at least one radar antenna mounted behind the display device, as viewed from the passenger compartment;
    receiving a reflection of the radar signal, respectively into and from a respective sensing region in the passenger compartment;
    sensing at least a relative movement of a hand in the passenger compartment based on the reflection respectively received by the at least one radar transceiver; and
    setting an adjustment value displayed by the graphical operating element based on a comparison of at least the relative movement with stored patterns of movement respectively correlated to predefined adjustment values.

18. The method as claimed in claim 17,
further comprising:
- storing in a memory patterns of predefined movements correlated to adjustment values, each of the patterns of the predefined movements corresponding to a time profile of the reflection of the radar signal received when one of the predefined movements is performed during calibration prior to said displaying;
- comparing the relative movement of the hand obtained by said sensing with the patterns of movement stored in the memory during the calibration, and
- wherein said setting sets the adjustment value to a stored adjustment value included in the adjustment values stored in the memory and correlated to a matching pattern of movement from among the predefined movements identified by said comparing.

19. The method as claimed in claim 17,
wherein the operating element is a rotary controller, and
wherein the control device is configured to sense a rubbing movement of at least two fingers of the hand as the relative movement.

20. The method as claimed in claim 19, wherein the control device includes a memory storing the stored patterns of movement, each corresponding to a time profile of the reflection of the radar signal.

\* \* \* \* \*